(12) United States Patent
Certain et al.

(10) Patent No.: US 11,418,345 B2
(45) Date of Patent: *Aug. 16, 2022

(54) DIGEST PROOFS IN A JOURNALED DATABASE

(71) Applicant: Amazon Technologies, Inc., Seattle, WA (US)

(72) Inventors: Tate Andrew Certain, Seattle, WA (US); Benjamin Nelson Glowney, Seattle, WA (US); Allan Henry Vermeulen, Parksville (CA)

(73) Assignee: Amazon Technologies, Inc., Seattle, WA (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/446,512

(22) Filed: Jun. 19, 2019

(65) Prior Publication Data

US 2020/0403797 A1 Dec. 24, 2020

(51) Int. Cl.
| | | |
|---|---|---|
| *G06F 12/14* | (2006.01) | |
| *H04L 9/32* | (2006.01) | |
| *G06F 21/60* | (2013.01) | |
| *G06F 16/23* | (2019.01) | |
| *H04L 9/06* | (2006.01) | |
| *G06F 11/30* | (2006.01) | |

(52) U.S. Cl.
CPC ........ *H04L 9/3218* (2013.01); *G06F 16/2379* (2019.01); *G06F 21/602* (2013.01); *H04L 9/0643* (2013.01)

(58) Field of Classification Search
CPC . G06F 16/2379; G06F 21/602; H04L 9/0643; H04L 9/3218
See application file for complete search history.

(56) References Cited

U.S. PATENT DOCUMENTS

| | | | |
|---|---|---|---|
| 4,309,569 A | 1/1982 | Merkle | |
| 6,901,509 B1* | 5/2005 | Kocher | H04L 9/3236 713/176 |
| 9,910,870 B2 | 3/2018 | Yan | |
| 10,261,711 B1* | 4/2019 | Pasirstein | G06F 21/6218 |
| 2007/0220261 A1 | 9/2007 | Farrugia et al. | |
| 2007/0248226 A1* | 10/2007 | Chong | H04N 21/2383 375/E7.009 |
| 2007/0276843 A1* | 11/2007 | Lillibridge | G06F 16/125 |

(Continued)

OTHER PUBLICATIONS

International Search Report and Written Opinion dated Aug. 17, 2020, in International Patent Application No. PCT/US2020/037902, filed Jun. 16, 2020.

(Continued)

*Primary Examiner* — Gary S Gracia
(74) *Attorney, Agent, or Firm* — Davis Wright Tremaine LLP

(57) ABSTRACT

A database management system stores an entry in a journal. Upon storage of the entry, the journal comprises a plurality of threaded leaf nodes and a hierarchy of interior nodes comprising hash values computed from the threaded leaf nodes. A first set of hash values is provided to prove that the entry is stored in a first version of the journal. A second set is provided to prove that the entries stored in the first version of the journal are unmodified and stored in a second version of the journal.

20 Claims, 13 Drawing Sheets

(56) References Cited

U.S. PATENT DOCUMENTS

| | | | |
|---|---|---|---|
| 2010/0185847 A1* | 7/2010 | Shasha | G06F 21/606 |
| | | | 711/147 |
| 2011/0283085 A1* | 11/2011 | Dilger | G06F 11/1004 |
| | | | 711/216 |
| 2012/0233658 A1* | 9/2012 | Piersol | G06F 21/64 |
| | | | 726/2 |
| 2015/0033024 A1 | 1/2015 | Mashima et al. | |
| 2015/0128283 A1 | 5/2015 | Mashima et al. | |
| 2015/0188715 A1 | 7/2015 | Castellucci et al. | |
| 2016/0203170 A1* | 7/2016 | Mosko | G06F 16/282 |
| | | | 707/741 |
| 2016/0254906 A1 | 9/2016 | Castellucci et al. | |
| 2017/0272250 A1 | 9/2017 | Kaliski, Jr. | |
| 2018/0205552 A1 | 7/2018 | Struttmann et al. | |
| 2018/0219685 A1* | 8/2018 | Deery | G06F 21/645 |
| 2018/0307857 A1* | 10/2018 | Beecham | G06F 16/9024 |
| 2019/0012466 A1* | 1/2019 | Ricotta | H04L 67/1097 |
| 2019/0065709 A1* | 2/2019 | Salomon | H04L 9/0643 |
| 2019/0129972 A1* | 5/2019 | Borate | G06F 16/1748 |
| 2019/0228086 A1* | 7/2019 | Bordens | G06F 16/2365 |
| 2019/0228386 A1* | 7/2019 | Onnainty | G06Q 20/3827 |
| 2019/0253256 A1* | 8/2019 | Saab | H04L 9/3239 |
| 2019/0327080 A1* | 10/2019 | Liu | H04L 63/0209 |
| 2020/0014527 A1 | 1/2020 | Subramaniam | |
| 2020/0151714 A1 | 5/2020 | Chan et al. | |
| 2020/0174990 A1 | 6/2020 | Pratkanis | |
| 2020/0313878 A1* | 10/2020 | Wang | G06F 16/1734 |
| 2020/0320204 A1 | 10/2020 | Venable, Sr. et al. | |
| 2020/0394154 A1 | 12/2020 | Blackshear et al. | |
| 2020/0394159 A1 | 12/2020 | Hurley | |
| 2020/0401568 A1* | 12/2020 | Certain | G06F 16/2246 |
| 2020/0401626 A1* | 12/2020 | Certain | G06F 16/21 |
| 2020/0403797 A1* | 12/2020 | Certain | H04L 9/0643 |
| 2020/0403800 A1* | 12/2020 | Certain | G06F 16/2379 |

OTHER PUBLICATIONS

International Search Report and Written Opinion dated Sep. 16, 2020, in International Patent Application No. PCT/US2020/037899, filed Jun. 16, 2020.

Stone, "Tree Signature Variations using Commutative Hash Trees," Medium.com, Nov. 20, 20218, https://g-andrew-stone.medium.com/tree-signature-variations-using-commutative-hash-trees-4a8a47d4f8ce, 7 pages.

* cited by examiner

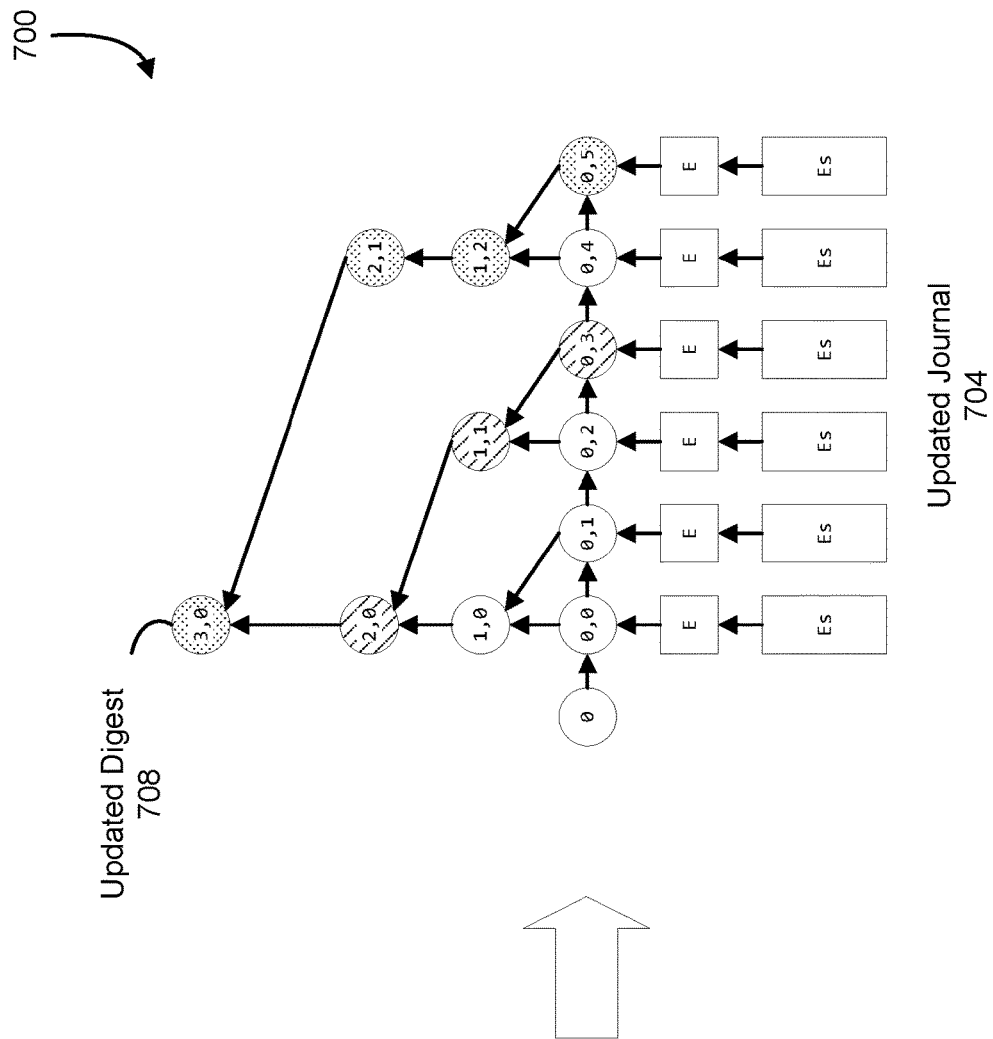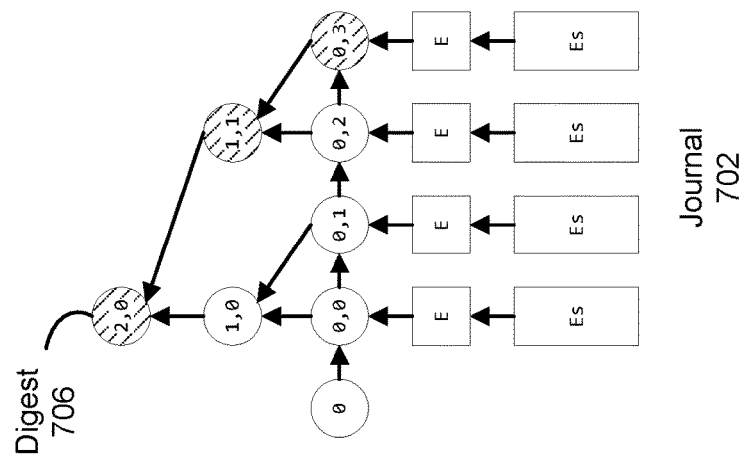
FIG. 7

US 11,418,345 B2

DIGEST PROOFS IN A JOURNALED DATABASE

CROSS REFERENCE TO RELATED APPLICATIONS

This application incorporates by reference for all purposes the full disclosure of U.S. patent application Ser. No. 16/446,543, filed concurrently herewith, entitled "SYMMETRIC FUNCTION FOR JOURNALED DATABASE PROOF", and U.S. patent application Ser. No. 16/446,528, filed concurrently herewith, entitled "THREADED LEAF NODES IN DATABASE JOURNAL", and U.S. patent application Ser. No. 16/446,556, filed concurrently herewith, entitled "DATABASE JOURNAL REDACTION".

BACKGROUND

Database management systems are increasingly called upon to provide advanced security and auditing capabilities. One such category of feature involves the cryptographic verification of transaction history. For example, a database management system might be called upon to provide verifiable proof that a record stored in the database has not been altered. However, techniques for providing such proofs may conflict with requirements to support high rates of transactional throughput.

BRIEF DESCRIPTION OF THE DRAWINGS

Various techniques will be described with reference to the drawings, in which:

FIG. 7 illustrates aspects of performing a journal proof, in accordance with an embodiment;

DETAILED DESCRIPTION

Figure 1:
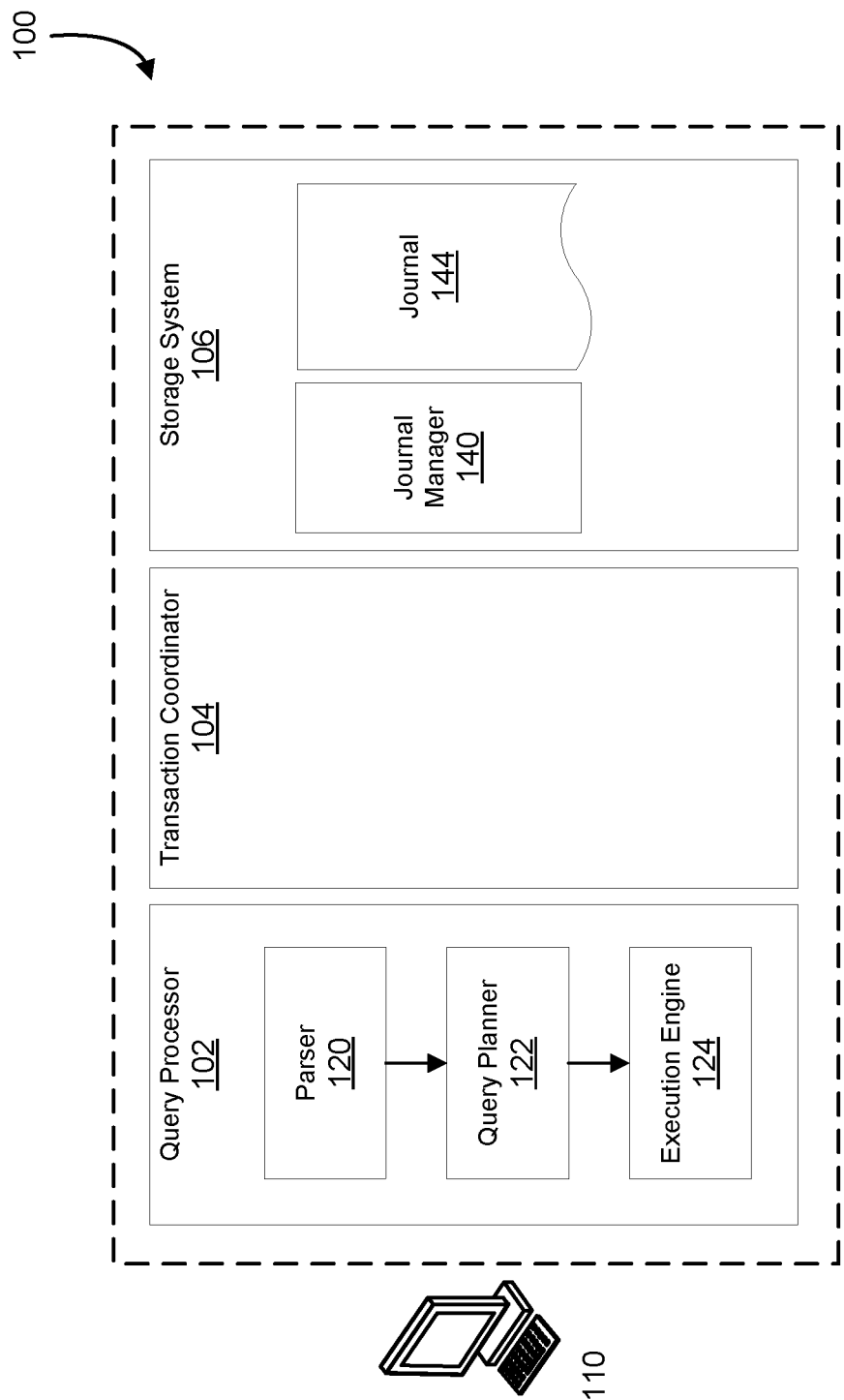
FIG. 1 illustrates a ledger-based database system, in accordance with an embodiment.

Described herein are systems and techniques related to the operation of journaled database management system. A journaled database management system, as described herein, maintains a journal structure which stores an immutable history of transactions performed on a collection of data maintained by the system. The journaled database further provides various cryptographic verification features using a cryptographic hash tree structure that has been adapted to sustain high throughput and large transaction volumes.

In an example embodiment, the journaled database management system responds to commitment of a transaction by storing an entry in association with a leaf node of a hash tree. The leaf nodes of the tree are threaded, such that the hash stored in the newest leaf node is computed based on the hash of preceding node, and based on the hash of the entry. The threading of the leaf nodes, in this fashion, provides support for various cryptographic verification features. In at least one embodiment, the threading of the leaf nodes supports range proofs.

In an example embodiment, the journaled database management system computes hashes using a symmetric hash operator. The symmetric hash operator computes a cryptographic hash such that, given a plurality of operands, it produces equivalent output regardless of the order of the operands. In at least one embodiment, the symmetric hash operator sorts the operands, concatenates the sorted operands, and outputs a cryptographic hash of the concatenation.

In an example embodiment, the journaled database management system provides a proof that entries covered by, or cryptographically verified by, a first digest of a journal are also covered by a second digest from a subsequent version of the journal.

In an example embodiment, the journaled database management system supports redaction of entries. In response to a request to delete an entry from the journal, the database management system deletes the entry but retains the entry hash that was computed based on the entry. Further, any hashes dependent on the retained entry hash are also retained.

A hash tree, as used herein, refers to a structure in which cryptographic hashes are stored. A hash tree may sometimes be referred to as a signature tree, cryptographic verification tree, hash signature tree, and so forth. A cryptographic hash may be described as a cryptographic signature, and may also be described herein as a hash.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including that embodiments disclosed herein provide high transaction commit rates coupled with the ability to provide cryptographic verification of the integrity of the committed transactions.

FIG. 1 illustrates a journaled database management system, in accordance with an embodiment. The example journaled database management system 100 comprises a query processor 102, transaction coordinator 104, and storage system 106.

A client device 110 may send requests to the database system 100. In an embodiment, a query processor 102 comprises a module operative on a computing device comprising at least one processor and a memory. As used herein, a module or sub-module refers to a portion of the memory in which processor-executable instructions are stored, where the instructions, when executed by the processor, cause the computing device to perform the functions attributed to the module. The query processor 102 performs functions related to processing requests received from the client device 110. The query processor 102 may comprise a parser 120, query planner 122, and execution engine 124. The database system 100 may comprise a fleet of query processors similar to the query processor 102 depicted in FIG. 1, to facilitate scaling.

In an embodiment, the parser 120 performs lexical and semantic analysis of a received query. The query planner 122 determines a plan for executing the received query, and the execution engine 124 obtains and executes the plan.

In an embodiment, a transaction coordinator 104 comprises a module operative on a computing device comprising at least one processor and a memory. The transaction coordinator 104 can be co-located on a computing device with other modules, such as the query processor 102, or it may be located on a separate computing device. The database system 100 may comprise a fleet of transaction coordinators similar to the transaction coordinator 104 depicted in FIG. 1, to facilitate scaling. The transaction coordinator, in an embodiment, acts to facilitate the performance of operations initiated by the execution engine 124, and may further act as an interface to the storage system 106.

In an embodiment, a storage system 106 comprises a module operative on a computing device comprising at least one processor and a memory. The storage system 106 can be co-located on a computing device with other modules, or located on a separate computing device. The database system 100 may comprise a fleet of storage systems similar to the storage system 106 depicted in FIG. 1, to facilitate scaling. The storage system 106 may comprise various sub-modules, including a journal manager 140 which maintains the journal 144. In general, the storage system 106 is responsible for performing storage and retrieval operations on the ledger, and the journal manager 140 maintains the journal 144. Examples of a journal are provided herein, for example with respect to FIG. 2.

Figure 2:
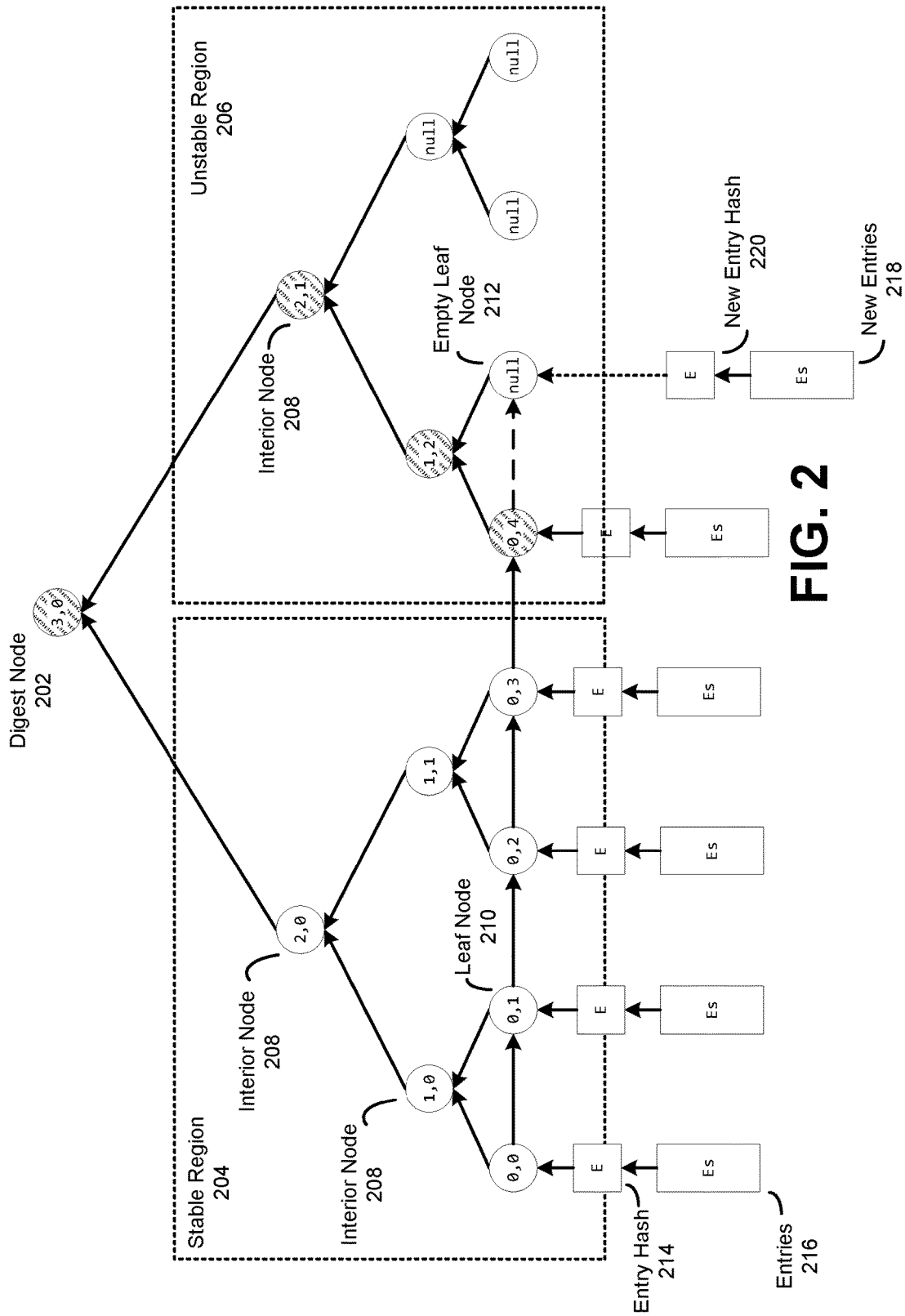
FIG. 2 illustrates an example of a journal tree, in accordance with an embodiment.

FIG. 2 illustrates an example of a journal tree, in accordance with an embodiment. The example journal of FIG. 2 comprises a plurality of leaf nodes 210, 212 and interior nodes 208 organized into a hierarchy. For illustrative and descriptive purposes, the nodes of the hierarchy may be labeled according to their level in the hierarchy and their position within a level. For example, the leaf nodes 210 may be labelled as {0,0}, {0,1}, {0,2}, and so on. Above the leaf level, the first level of interior nodes 208 may be labelled as {1,0}, {1,1}, {1,2}, and so on.

The empty leaf nodes 210 may individually comprise a hash value that is based at least in part on a respective entry hash 214. The respective entry hash 214 is computed by applying a hash value to the respective entries 216. In at least one embodiment, a cryptographically secure hash function is applied to the entries 216 in order to generate a hash value that could not be easily generated without access to the entries 216. Example of hash functions which may be used include, but are not limited to, the secure hash algorithm ("SHA"), message digest ("MD") algorithms, and so forth.

Figure 3:
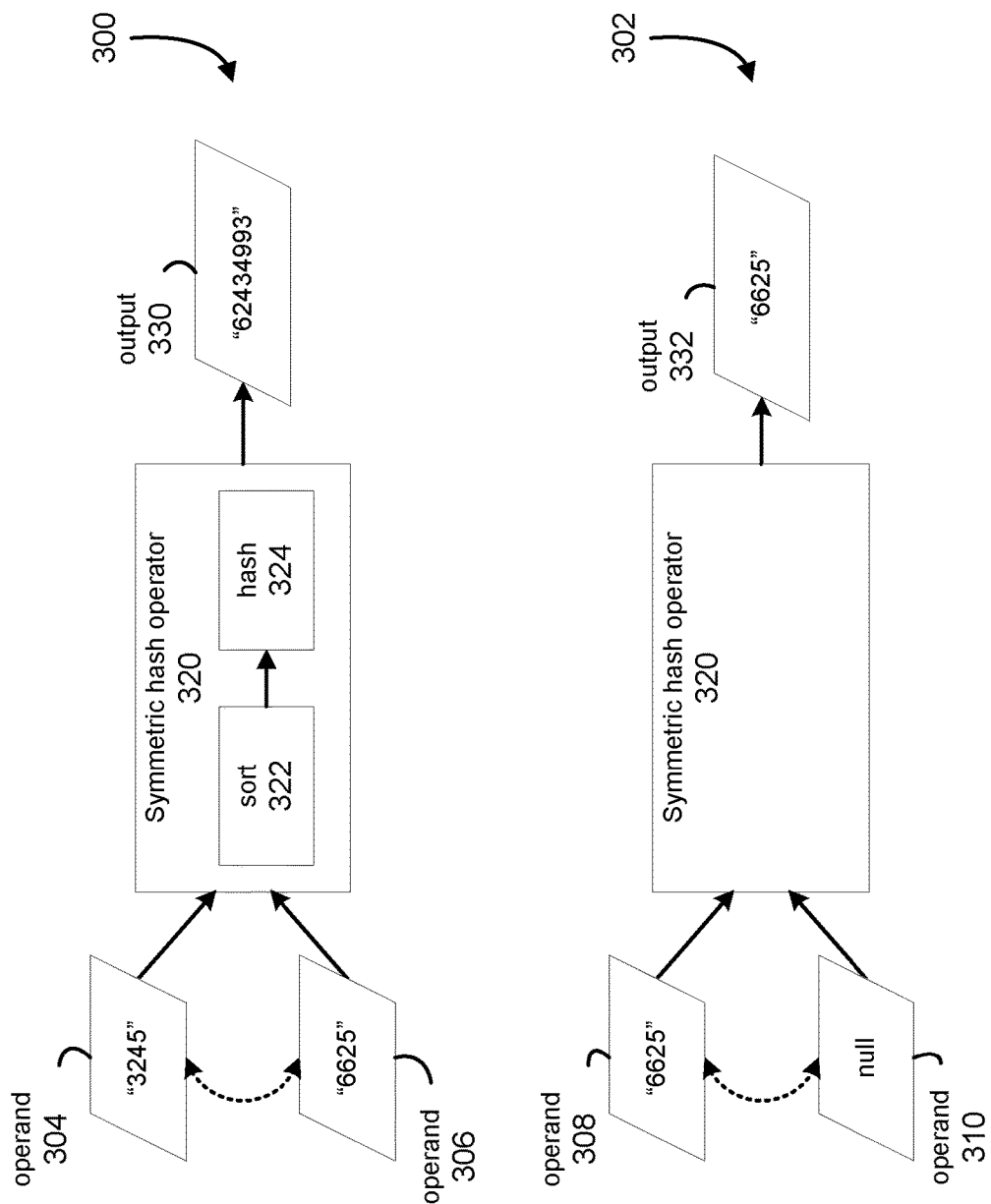
FIG. 3 illustrates an example of a symmetric hash operator, in accordance with an embodiment.

In at least one embodiment, the leaf nodes 210 are arranged as an ordered list, and the hash value of a leaf node is based not only on the value of a respective entry hash 214, but also on the hash value of a prior leaf node. For example, the value of the leaf node {0,2} may be based on a combination the hash of node {0,1} and on the entry hash of {0,2}. In at least one embodiment, a symmetric hash operator, such as the symmetric hash operator depicted in FIG. 3, is used.

Each of the interior nodes 208 individually comprises a hash value based on the hash values of the respective node's children. For example, the node at {1,0} is based on the hash values of the nodes at {0,0} and {0,1}. Similarly, the node at {2,0} is based on the hash values of the nodes at {1,0} and {1,1}.

Nodes are added to the rightmost available position in the leaf level of a hash tree. In the example 200 of FIG. 2, the first such available position is the empty leaf node 212 at position {0,5}. A new transaction, represented as new entries 218, is added to the journal by computing a new entry hash 220 and a hash to store in the empty leaf node 212 at {0,5}. As noted, this value may be a combination of the hash from {0,4} and of the new entry hash 220, generated via application of a symmetric hash operator.

Note that the nodes 208, 210, 212 of the journal may be classified as belonging to one of two regions. In the stable region 204, all nodes are complete in the sense that their corresponding hash values will not change upon the addition of new nodes and the expansion of the tree. In the unstable region 206, nodes may be wholly or partially incomplete. For example, the node {1,2}, prior to the addition of the new entries 218, is based on a finalized hash from {0,4} and a null hash from {0,5}. Similarly, the node at {1,3} is null because its child nodes at {0,6} and {0,7} are null.

Nodes which are partially complete, meaning that they are based on at least one stable hash value and at least one incomplete value, such as null, occupy a position in the unstable region 206 which may be referred to as a frontier of the hierarchy. In the example of FIG. 2, the frontier corresponds to nodes at {0, 4}, {1, 2}, {2, 1}, and {3, 0}. In at least one embodiment, nodes along the frontier are updated as new entries are added to the journal.

In at least one embodiment, the null nodes depicted in FIG. 2 are not instantiated until needed to store a hash value. For example, instantiation of the node at {0,5} may be deferred until the new entries 218 are to be stored in the journal.

In at least one embodiment, the journal depicted in FIG. 2 is viewed as being of an unlimited size and comprising an unlimited number of parent nodes above the depicted digest node {3,0}. For example, the node {3,0} might be viewed as having a parent node {4,0} whose children are {3,0} and {3,1}. These additional nodes, e.g. {4,0}, {3,1}, may be instantiated as necessary as new entries and their corresponding leaf nodes are added to the journal.

In at least one embodiment, the topmost instantiated node may be treated as a digest node 202 of the journal. It will be noted that hash value of the digest node 202 is based on the hash values of all of its descendants, which in turn are based on hashes computed from the entries 216. As such, the digest node 202 is difficult, if not impossible, to recreate without access to the original entries 216 or their respective entry hashes 214.

In at least one embodiment, the hash values for the nodes of the journal 200 are calculated using a symmetric hash operator. FIG. 3 illustrates examples 300, 302 of a symmetric hash operator, in accordance with at least one embodiment. In at least one embodiment, the symmetric hash operator is a module or other software-implemented function for performing the described operations. In at least one embodiment, the symmetric hash operator comprises processor-executable instructions. For example, in at least one embodiment, a journal manager module comprises instructions for performing a symmetric hash. FIG. 1 depicts an example of a journal manager module 114.

In the first example 300 of FIG. 3, two operands 304, 306 are provided to a symmetric hash operator 320. The symmetric hash operator 320 produces output 330. For a given set of values X and Y, the symmetric hash operator 320 will always produce a value Z. This is true regardless of the order of the operands. For example, X·Y=Z and Y·X=Z, where "·" indicates the symmetric hash operator 320.

In at least one embodiment, the symmetric hash operator 320 calculates output 330 by sorting, concatenating, and hashing the operands 304, 306. For example:

$$3245 \cdot 6625 \Rightarrow 32456625 \Rightarrow (32456625) \Rightarrow 62434993$$

$$6625 \cdot 3245 \Rightarrow 32456625 \Rightarrow h(32456625) \Rightarrow 62434993$$

As seen here, the output of the symmetric hash operator 320 is the same regardless of the order of the operands 304, 306.

In at least one embodiment, the symmetric hash operator 320 comprises a sort sub-operator 322 which sorts and concatenates the operands to the symmetric hash operator 320, and a hash sub-operator 324 which calculates a hash value based on the sorted and concatenated input.

Referring to FIG. 2, a consequence of the symmetric hash operator is that the hash value of the node $\{1,0\}$ can be calculated if the hash values of $\{0,0\}$ and $\{0,1\}$ are known, even if it is not known which hash value belongs to $\{0,0\}$ and which hash value belongs to $\{0,1\}$. Thus the lists [3245, 6625] and [6625, 3245] can both be used as proofs of the value 62434993.

In the second example 302 of FIG. 3, the operands 308, 310 include a "null" value. For this case, the output 332 is defined to be equal to the non-null input. Thus:

$$X \cdot \text{null} = X$$

$$\text{null} \cdot X = X$$

Again referring to FIG. 2, application of the symmetric hash operator 320 to a node such as $\{1,2\}$, which has as children the completed node $\{0,4\}$ and the null node at $\{0,5\}$, results in the value of $\{1,2\}$ being equivalent to the value of the completed node $\{0,4\}$.

In at least one embodiment, the use of the symmetric hash operator to calculate hash values for interior nodes and/or leaf nodes of the journal conveys one or more advantages. The advantages may include increasing efficiency of updating the frontier nodes of the hierarchy as new entries and corresponding nodes are added to the journal. The advantages may also include reducing the complexity of proofs by minimizing the amount of knowledge needed to verify the proof. In particular, a client verifying the proof may require less information pertaining to the structure of the journal when a symmetric hash operator is used to compute hashes for the journal's interior and/or leaf nodes.

Figure 4:
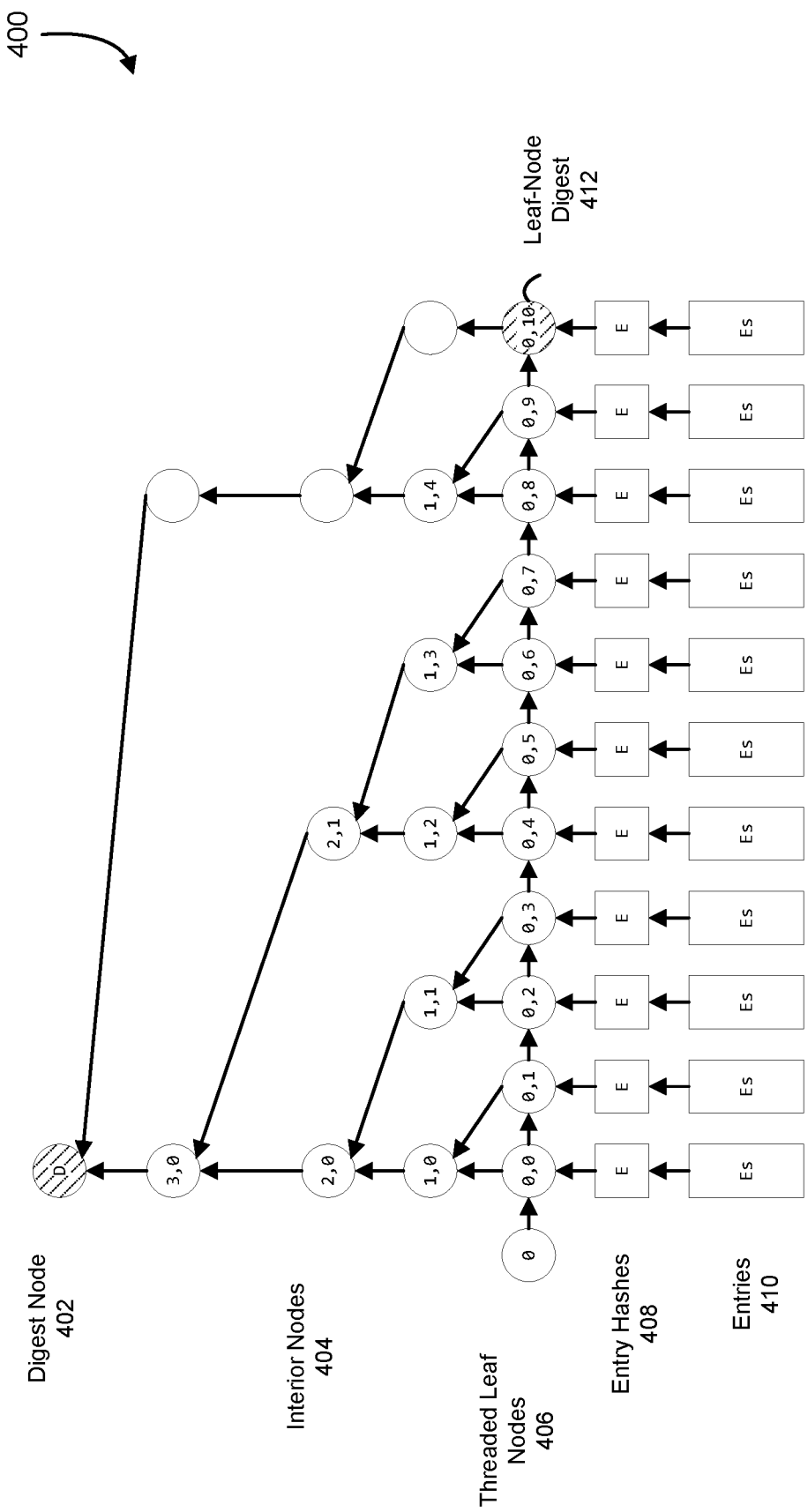
FIG. 4 illustrates aspects of a journal structure, in accordance with an embodiment.

FIG. 4 illustrates aspects of a journal structure, in accordance with an embodiment. The example journal 400 is similar to the example journal 200 of FIG. 2. Like the corresponding elements of the journal depicted in FIG. 2, the example journal 400 of FIG. 4 comprises entries 410, entry hashes 408, leaf nodes 406, and interior nodes 404.

The leaf nodes 406 may be described as being threaded. This refers to the hash value of each leaf node being based on the hash value of a prior node. For example, in at least one embodiment, the node at $\{0,1\}$ is computed as a symmetric hash of a corresponding entry hash and the hash value from the prior node $\{0,0\}$. The leaf nodes 406 may further be described as being ordered. In FIG. 4, for example, the leaf node at $\{0,0\}$ precedes the leaf node at $\{0,1\}$, and the leaf node at $\{0,1\}$ precedes the leaf node at $\{0,2\}$. The order stems from the use of the prior hash value. Because the hash value of $\{0,1\}$ is based in part on the hash value of the leaf node at $\{0,0\}$, the leaf node $\{0,1\}$ is considered to follow the leaf node $\{0,0\}$. Likewise, $\{0,2\}$ follows $\{0,1\}$, and so on.

The node at the root of the hierarchy may be described as being a digest node 402. The hash value of the digest node 402 is based on the hash values of all other nodes in the tree. Similarly, the rightmost leaf node may be described as a leaf-node digest 412. The hash value of the leaf-node digest 412 is based on the hash values of all preceding leaf nodes, as well as the entry hash for its associated entries. Both the digest node 402 and the leaf-node digest 412 can be used to prove the integrity of the journal. Although their respective values will be different, the digest node 402 and the leaf-node digest 412, in at least one embodiment, comprise equivalent information regarding the integrity of the entries stored in the journal.

In at least one embodiment, the leaf-nodes 406 are used to provide a range proof. The range proof validates that a given set of records is represented in the journal. To illustrate, consider a request to provide a range proof for the entries corresponding to $\{0,7\}$, $\{0,8\}$, and $\{0,9\}$. A range proof for these nodes could comprise a list of hash values. For example, in at least one embodiment, the proof comprises the hash values at $\{0,6\}$ and $\{0,9\}$. The recipient of the proof could then confirm that:

$$\{0,6\} \cdot E_{\{0,7\}} = \{0,7\}$$

$$\{0,7\} \cdot E_{\{0,8\}} = \{0,8\}$$

$$\{0,8\} \cdot E_{\{0,9\}} = \{0,9\}$$

The journal is therefore confirmed to include the range of entries corresponding to $\{0,7\}$, $\{0,8\}$, and $\{0,9\}$ by showing that the hash value of $\{0,9\}$ can be recomputed based on the starting entry $\{0,6\}$ and the entries corresponding to $\{0,7\}$, $\{0,8\}$, and $\{0,9\}$.

In at least one embodiment, the range proof further comprises additional nodes necessary to validate one or both of the digests. Continuing the prior example, the recipient could validate the leaf-node digest 412 if the proof included the hash of $\{0,9\}$ and the entry hash of $\{4,10\}$.

Similarly, in at least one embodiment, the recipient could validate the digest node 402 if the proof included additional hashes necessary to re-compute the hash of the digest node. For example, the proof might include hash values from $\{2,0\}$, $\{1,2\}$, and $\{1,5\}$. A series of moves to validate the proof might then be determined by the recipient:

$$\{0,6\} \cdot \{0,7\} \Rightarrow \{1,3\}$$

$$\{0,8\} \cdot \{0,9\} \Rightarrow \{1,4\}$$

$$\{1,10\} \cdot \text{null} \Rightarrow \{1,5\}$$

$$\{1,2\} \cdot \{1,3\} \Rightarrow \{2,1\}$$

$$\{1,4\} \cdot \{1,5\} \Rightarrow \{2,2\}$$

$$\{2,2\} \cdot \text{null} \Rightarrow \{3,1\}$$

$$\{2,0\} \cdot \{2,1\} \Rightarrow \{3,0\}$$

$$\{3,0\} \cdot \{3,1\} \Rightarrow \text{Digest}$$

Note the effect of the symmetric hash operator's treatment of incomplete nodes, as described with reference to example 302 of FIG. 3. Thus, $\{1,4\} \cdot \{1,5\} \{2,2\} \{3,1\}$.

Figure 5:
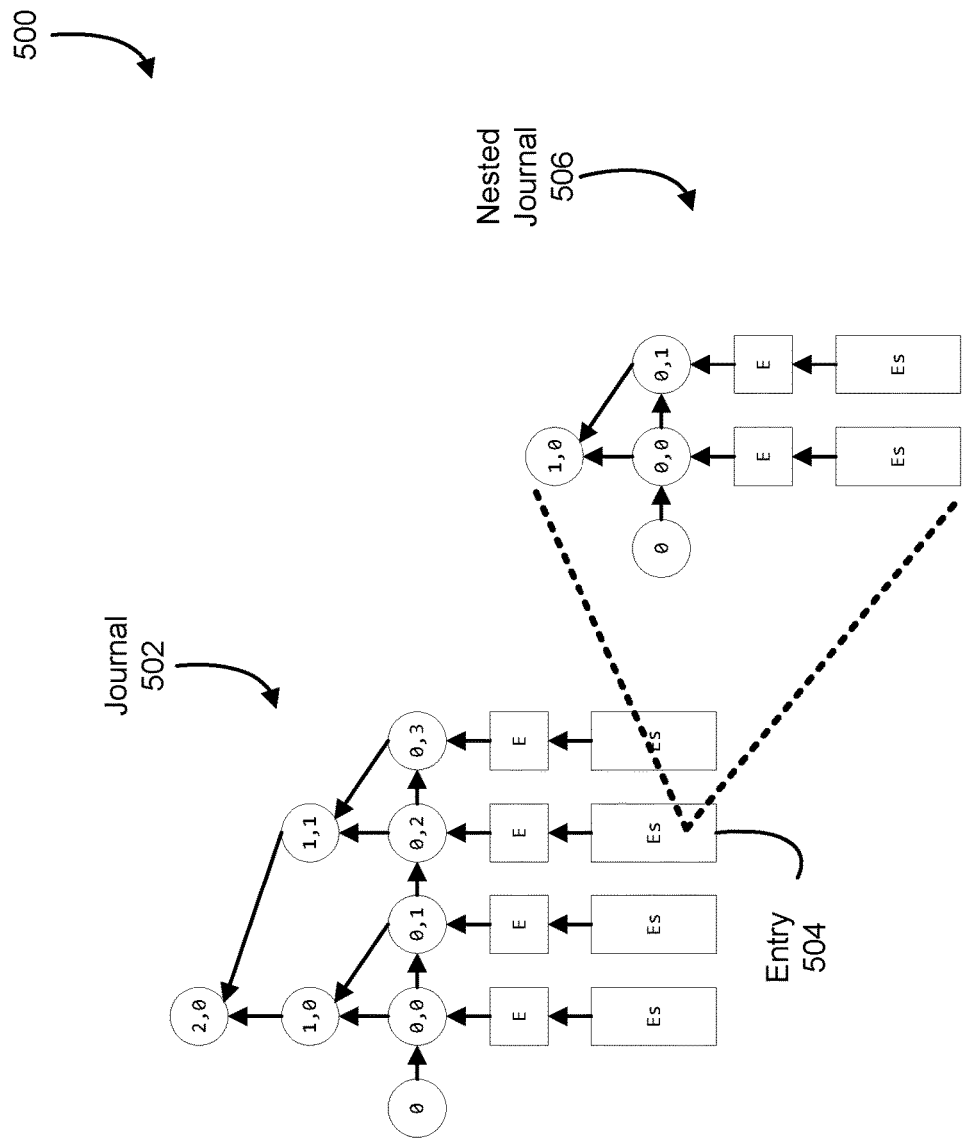
FIG. 5 illustrates further aspects of a journal structure, in accordance with an embodiment.

FIG. 5 illustrates further aspects of a journal structure, in accordance with an embodiment. In particular, FIG. 5 illustrates an example 500 in which a journal 502 comprises a nested journal 506 to store data corresponding to an entry 504 associated with a leaf-level node of the journal 502.

In embodiments, an entry of a journal may be any of a variety of data structures. For example, in an embodiment, one entry might be an array of bytes, and another entry in the same journal might be a nested journal, such as the nested journal 506 that is depicted in FIG. 5.

In at least one embodiment, the entry hash for the entry 504 in the journal 502 correspond to the digest node of the nested journal 506.

In at least one embodiment, the nesting depicted in FIG. 5 continues over a plurality of levels. For example, one or more of the entries associated with the leaf-level nodes of the nested journal 506 may themselves be represented by additional nested journals.

In at least one embodiment, a proof of an entry is provided for an entry stored in a nested journal, such as the nested journal 506 depicted in FIG. 5. However, a client verifying the proof need not be made aware of the nested structure, in at least one embodiment. For example, based on use of the symmetric hash operator described in relation to FIG. 3, the proof may comprise a list of hash values to which the symmetric hash operator may be successively applied.

Figure 6:
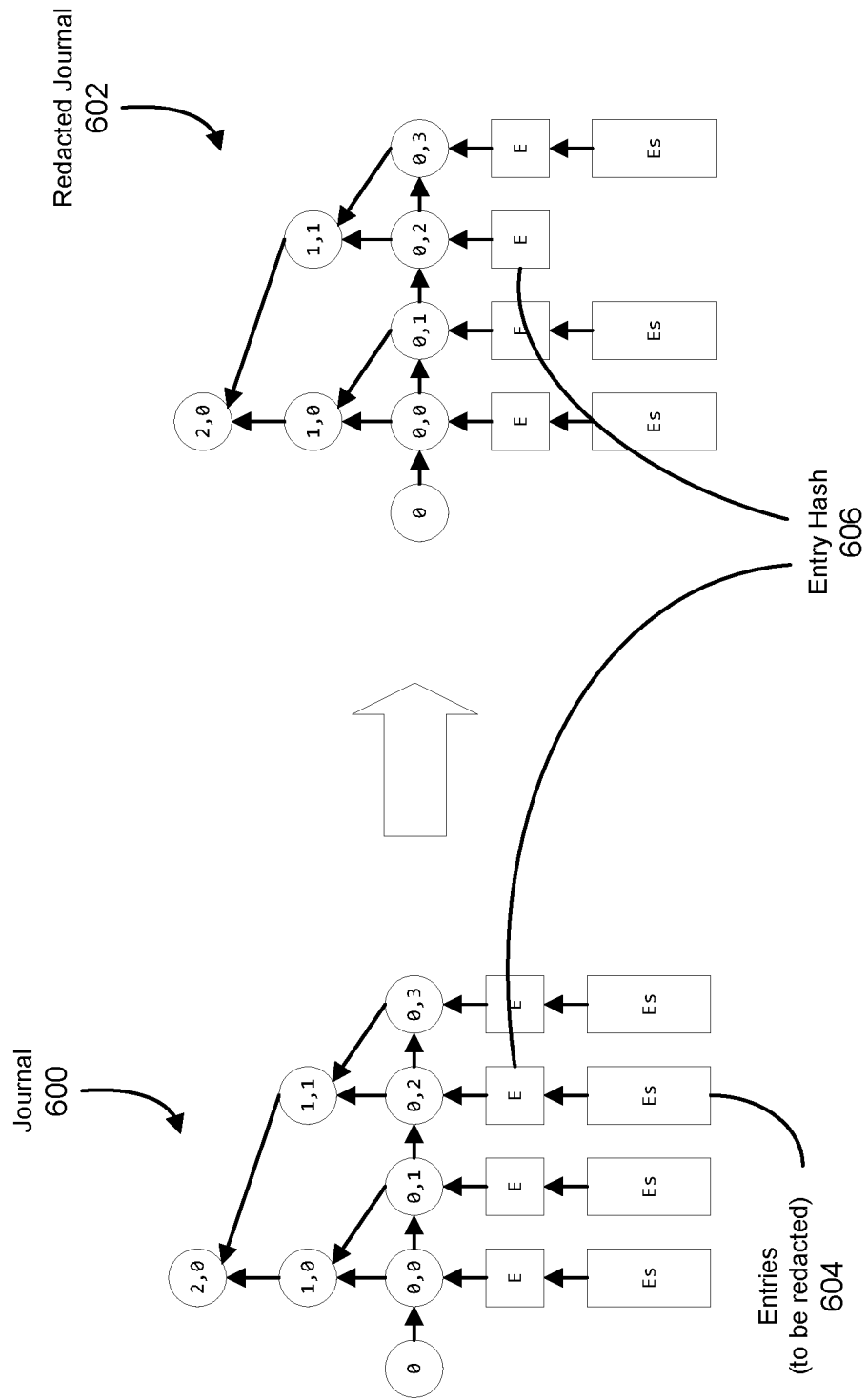
FIG. 6 illustrates journal redaction, in accordance with an embodiment.

FIG. 6 illustrates journal redaction, in accordance with an embodiment. Journal redaction comprises the removal of entries from the journal. In the example of FIG. 6, a journal 600 comprises entries 604 that are to be removed from the journal, and a corresponding entry hash 606.

In at least one embodiment, the entries 604 are removed from the journal 600 to form a redacted journal 602. The entries 604 are no longer in the redacted journal 602, but the corresponding entry hash 606 is retained. By retaining the entry hash 606, the other hash values in the redacted journal may remain constant. For example, the hash values of $\{0,2\}$, $\{0,3\}$, $\{1,1\}$, and $\{2,0\}$ need not be recomputed after the redaction of the entry at $\{0,2\}$.

In at least one embodiment, a proof comprises an entry hash and an indication that the entry hash corresponds to a redacted entry.

In an embodiment, an entry stored in a nested journal, such as the nested journal 506 depicted in FIG. 5, is redacted. Similarly to the example depicted by FIG. 6, an entry in the nested journal 506 may be deleted but its corresponding entry hash retained. Since this entry hash is retained, none of the other hash values in the nested journal 506 need be recomputed. Likewise, the leaf and root-node digests of the journal are also retained. If either of these is used as the hash value for the corresponding entry in the parent journal, it too may be retained.

FIG. 7 illustrates aspects of performing a digest proof, in accordance with an embodiment. In the depicted example 700, a digest proof is provided to confirm that records covered by a prior version of a digest are unchanged and covered by a new version.

When a digest is provided, it can be used to confirm that records covered by the digest are unchanged since the time the digest was created. However, if this version of the digest is discarded and a new version of the digest provided, the new version cannot be used to prove that the records were not changed in the period of time before the new digest was created. In other words, the guarantee provided by the old digest is not necessarily carried forward to the new digest. However, a digest proof can be used to confirm that all records covered by the old digest are unchanged and covered by the new version of the digest.

In the example 700 of FIG. 7, the nodes on the rightmost edge of the journal 702 are sufficient for proving the digest 706. These nodes are $\{0,3\}$, and $\{1,1\}$, as well as the digest node itself, at position $\{2,0\}$.

In the updated journal 704, the nodes on the rightmost edge of the updated journal 704 are sufficient for proving the updated digest 708. These nodes are $\{0,5\}$, $\{1,2\}$, $\{2,1\}$, and the updated digest node at $\{3,0\}$.

In at least one embodiment, the digest proof consists of hash values to show that the hashes of the original proof are subsumed by the hashes of the new proof, from $\{0,5\}$, $\{1,2\}$, $\{2,1\}$ and $\{3,0\}$. For example, the digest proof may consist of hash values to show that the hashes from $\{0,3\}$, $\{1,1\}$, and $\{2,0\}$ are subsumed by the hashes from $\{0,5\}$, $\{1,2\}$, $\{2,1\}$ and $\{3,0\}$.

To further illustrate, in at least one embodiment, a digest proof might proceed as follows:

$$\{0,3\} \cdot E_{\{0,4\}} \Rightarrow \{0,4\}$$

$$\{0,4\} \cdot E_{\{0,5\}} \Rightarrow \{0,5\}$$

$$\{0,4\} \cdot \{0,5\} \Rightarrow \{1,2\}$$

$$\{1,2\} \cdot \text{null} \Rightarrow \{2,1\}$$

$$\{2,0\} \cdot \{2,1\} \Rightarrow \{3,0\}$$

Figure 8:
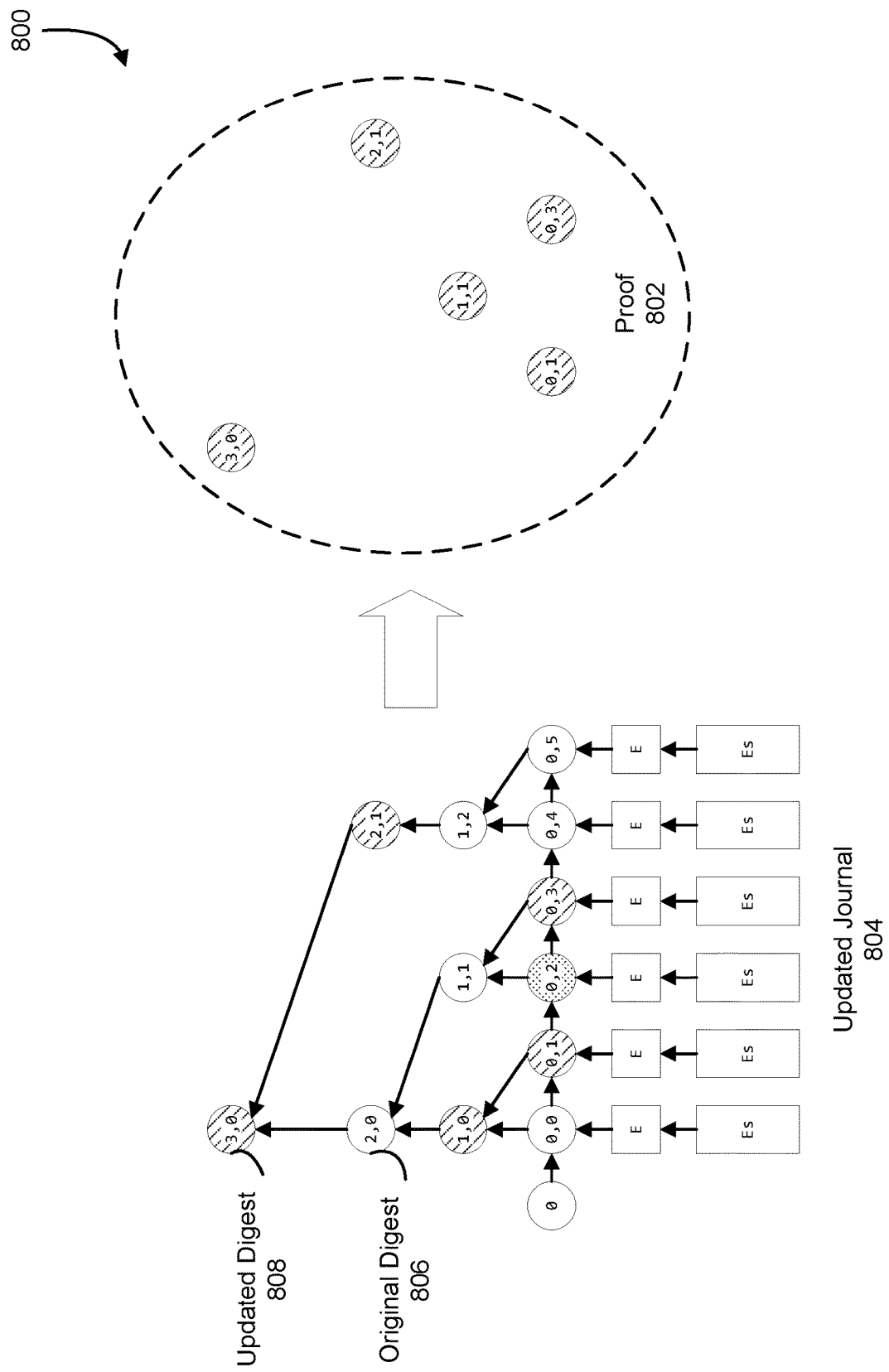
FIG. 8 illustrates aspects of a proof, in accordance with an embodiment.

FIG. 8 illustrates aspects of a proof, in accordance with an embodiment. In the example 800 of FIG. 8, the updated journal 804 corresponds to the updated journal 704 described in relation to the example 700 of FIG. 7. Further, in the example 800 of FIG. 8, it is assumed, for purposes of the example, that a request has been made for a proof that the entry $\{0, 2\}$ is both unmodified and included in the updated digest 808. Note that the entry corresponding to the node $\{0, 2\}$ was also included in the original digest 806. As such, if the original digest has been verified, and if it can be shown that the original digest 806 is subsumed by the updated digest 808, the proof is sufficient.

FIG. 8 illustrates one such proof 802, comprising the node $\{0, 1\}$, $\{0, 3\}$, $\{2, 1\}$, and the updated digest at $\{3, 0\}$. Using these nodes, the correctness of the original digest 806 can be verified by using the proof along with retained information, such as an entry hash for the original entry, recompute the original digest 806 and the updated digest 808. This confirms that the original digest 806 is subsumed by the updated digest 808.

Figure 9:
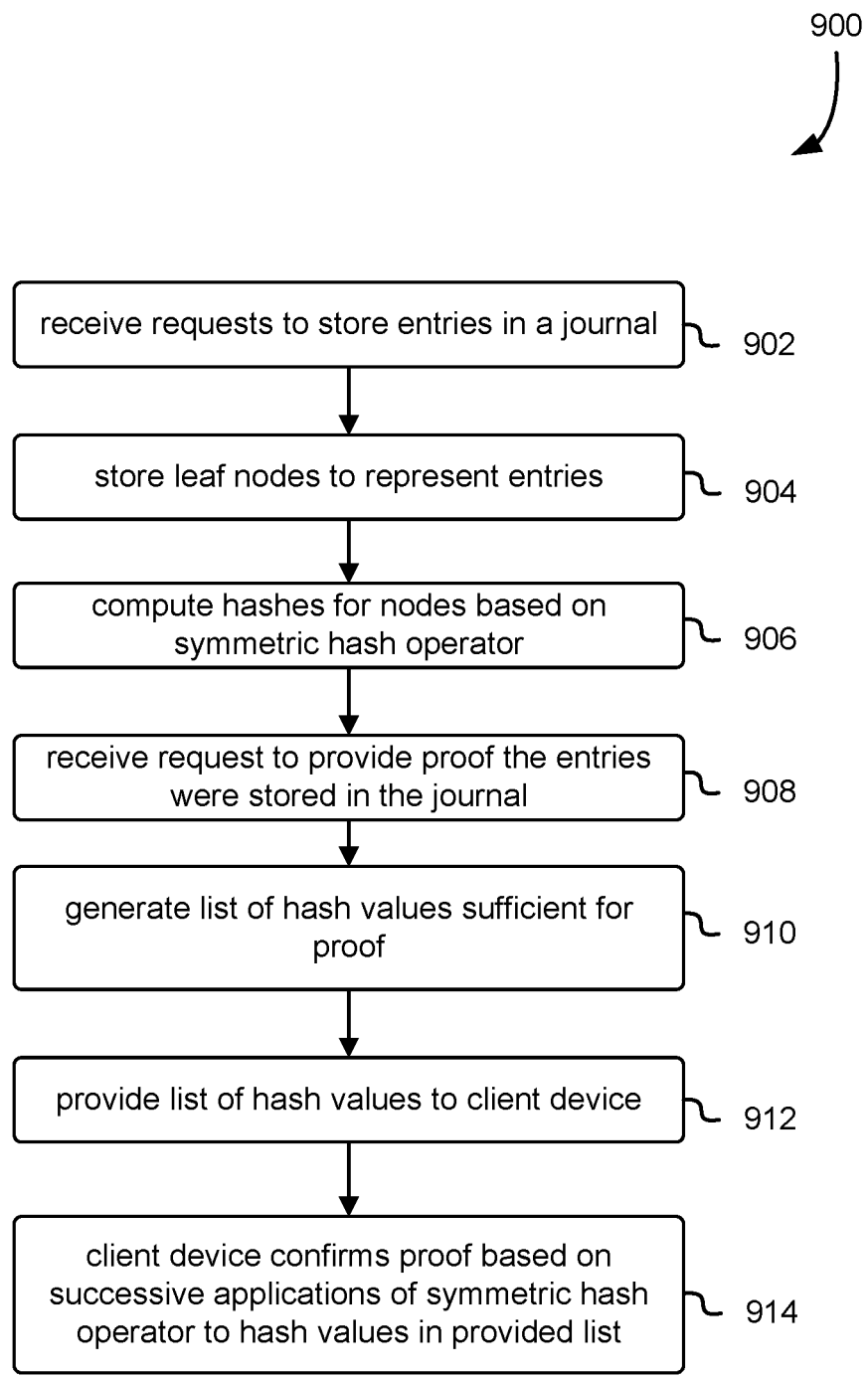
FIG. 9 illustrates an example process of using a symmetric hash operator to provide journal proofs, in accordance with an embodiment.

FIG. 9 illustrates an example process of using a symmetric hash operator to provide journal proofs, in accordance with an embodiment. Although the example 900 of FIG. 9 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Aspects of the example 900 include the use of a symmetric hash operator, such as the symmetric hash operator depicted in FIG. 3.

At 902, a journaled database management system receives requests to store entries in a journal. Examples of adding entries to a journal are illustrated herein, including for example with respect to FIGS. 2 and 7. The entries may comprise information indicative of a database transaction, such as an insert, update, or delete operation performed on an item of data stored in a collection of data.

At 904, the journaled database management system stores leaf nodes to represent the entries, and further stores interior nodes in a hierarchical arrangement, such as the arrangements depicted in FIGS. 2, and 4 7. As depicted by step 906, hashes for the nodes are computed using a symmetric hash operator.

At 908, the journaled database management system receives, from a client device, a request to provide a proof that the entries were stored in the journal. As described herein, the proof is simplified by the use of the symmetric hash operator.

At 910, the journaled database management system generates a list of hash values sufficient for the proof. The list of hash values is then provided to the client device, at 912 In at least one embodiment, a client device may confirm the proof, without data indicative of the structure of the journal's hierarchy, by successive application of the symmetric hash operator to the provided list of hash values.

At 914, the client device confirms the proof based on successive applications of the symmetric hash operator to the hash values in the list, resulting in a hash value that may be compared to a hash value retained by the client that is verifying the proof. For example, the resulting hash value may be compared to a digest value retained by the client. If equal, the proof is verified.

Figure 13:
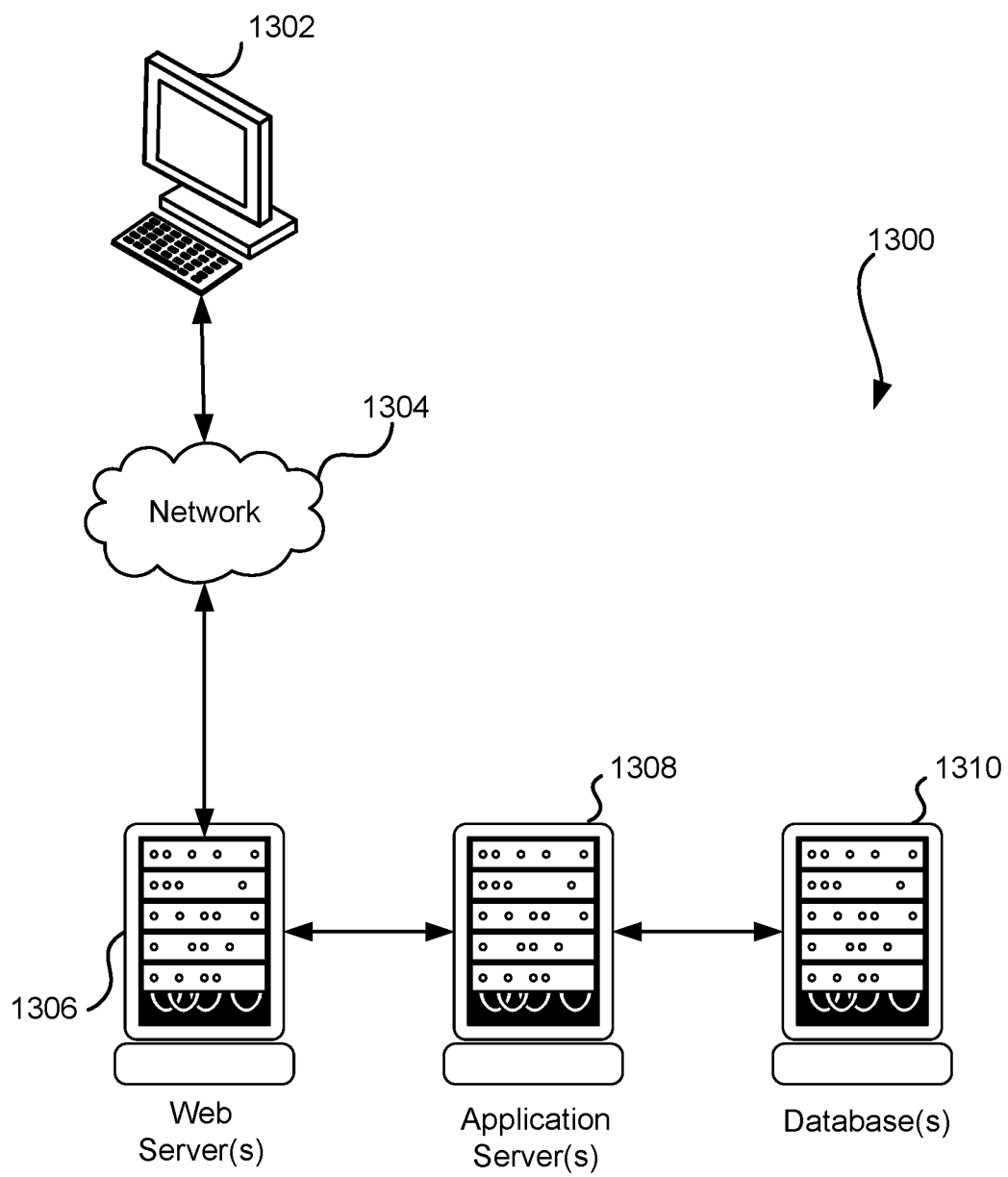
FIG. 13 illustrates a system in which various embodiments can be implemented.

The example 900 may be implemented by any of a variety of suitable systems, including for example the database servers 1310 depicted in FIG. 13.

In an example embodiment, a journaled database management system implements a method comprising storing an entry in a journal. The journal, upon storage of the entry, comprises a hierarchy of nodes. Non-limiting examples of a hierarchy of nodes are illustrated with respect to FIGS. 2 and 4-7. As described, an interior node of the hierarchy comprises a hash value computed by application of a symmetric hash operator applied to a first operand corresponding to first hash value of a first child node, and a second operand corresponding to a second hash value of a second child node. The example method further comprises providing a list of hash values that is sufficient for performing a cryptographic proof that the entry was stored in the journal.

In a further embodiment of the example method, the list of hash values is sufficient when a digest value can be computed by one more applications of the symmetric hash operator to hash values of the list. Here, digest value may refer to the hash value at the root of the hierarchy, or to a hash value at the end of a thread of leaf nodes.

In a further embodiment of the example method, the output of the symmetric hash operator, when applied to first and second operands, is equivalent irrespective of an order of the first and second operands.

In a further embodiment of the example method, the output of the symmetric hash operator is based at least in part on a sorting and concatenation of the first and second operands.

In a further embodiment of the example method, the symmetric hash operator computes its output hash value from the concatenation of the first and second operands.

In a further embodiment of the example method, the output of the symmetric hash operator is equivalent to the first operand when the second operand is null. Thus, an invocation of the symmetric hash operator with a hash value of X and a null value will, regardless of the order of the operands, result in the symmetric hash operator returning a value of X.

In a further embodiment of the example method, the hierarchy of nodes comprises a leaf node. The leaf node comprises a reference to the entry, and further comprises a hash value that is based on application of the symmetric hash operator to an entry hash and a hash value of a second leaf node.

Figure 10:
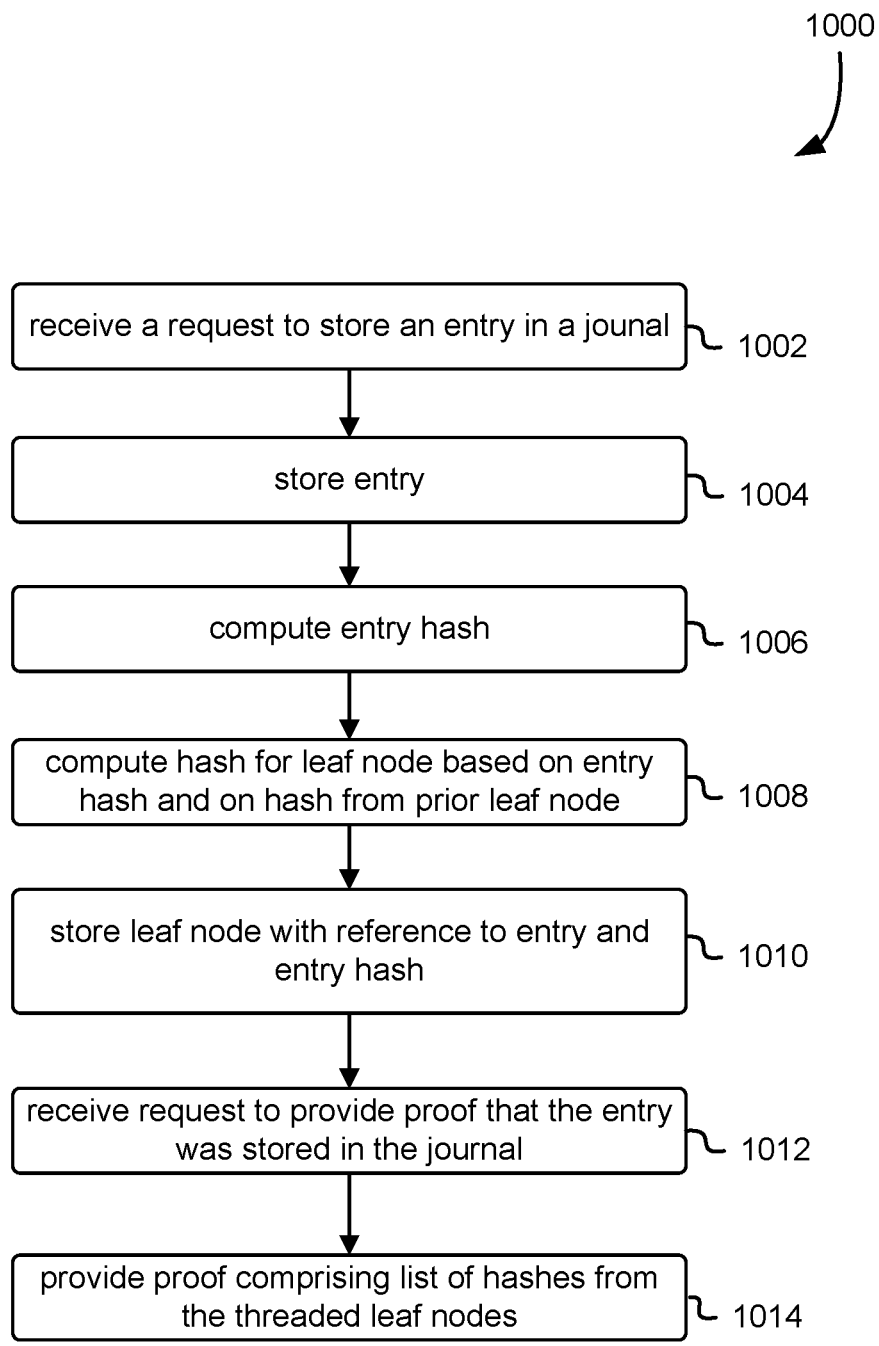
FIG. 10 illustrates an example process of using threaded leaf nodes to provide journal proofs, in accordance with an embodiment.

FIG. 10 illustrates an example process of using threaded leaf nodes to provide journal proofs, in accordance with an embodiment. Although the example 1000 of FIG. 10 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 1002, a journaled database management system receives requests to store an entry in a journal. Examples of adding entries to a journal are illustrated herein, including for example with respect to FIGS. 2 and 7. The entries may comprise information indicative of a database transaction, such as an insert, update, or delete operation performed on an item of data stored in a collection of data.

In the example 1000, entries are stored in a journal that comprises a threaded leaf node structure. Thus, at 1004, one or more records indicative of the entry are stored. At 1006, an entry hash is computed. The entry hash acts as a cryptographic signature of the entry, and cannot easily be reproduced without access to the entry. At 1008, a threaded hash value is computed. The threaded hash value is computed based on the entry hash and on the hash value from the prior leaf node. This results in an ordered plurality of leaf nodes, such as the ordered plurality depicted in FIG. 4. The leaf nodes are threaded together based on the use of the prior leaf node's hash value in computing the threaded hash value of the succeeding leaf node.

At 1010, the leaf node is stored. The stored leaf node comprises the threaded hash value just described, and may also include a copy of the entry hash and a reference to the entry itself.

At 1012, the journaled database management system receives a request to prove that the entry was stored in the journal. Note that the request may be part of a range proof, which refers to the validation of a plurality of entries. Hierarchical node structures may be less suited for such proofs than the threaded structure described in relation to FIG. 10.

At 1014, the journaled database management system provides the proof. In at least one embodiment, the proof comprises a list of hashes from the threaded leaf nodes. By successive applications of a symmetric hash operator to the hashes of the list, it may be reduced to a single hash value that can be compared to a corresponding value retained by the client. For example, the hash value computed from the list can be compared to a digest value retained by the client.

The example 1000 may be implemented by any of a variety of suitable systems, including for example the database servers 1310 depicted in FIG. 13.

In an example embodiment, a journaled database management system implements a method comprising storing an entry in a journal. The journal includes a hierarchy of interior nodes and a plurality of leaf nodes. Examples of this structure are illustrated by FIGS. 2 and 4-7. The leaf nodes are ordered, such that a given leaf node comprises a threaded hash value based at least in part on the entry hash and the threaded hash value of the prior leaf node. Based on this structure, the journaled database management system provides, according to the example method, a set of hash values from the leaf nodes, wherein the set of hash values is sufficient for proving that the entry was stored in the journal.

In a further embodiment of the example method, the example method comprises providing the list of hash values in response to a request to prove that the entry was stored in the journal.

In a further embodiment of the example method, the entry is indicative of a database transaction.

In a further embodiment of the example method, the list of hash values is provided to a client for proving that the entry and a plurality of additional entries were stored in the journal.

In a further embodiment of the example method, the example method comprises calculating a hash value for an interior node based at least in part on first and second leaf nodes, wherein the first and second leaf nodes are children of the interior node.

In a further embodiment of the example method, the example method comprises computing the hash value of the second leaf node based at least in part on a symmetric hash operator.

In a further embodiment of the example method, the list of hash values comprises a hash value for a leaf node prior to the first and second leaf nodes.

In a further embodiment of the example method, the list of hash values is sufficient when a digest value can be computed by one more applications of a symmetric hash operator to hash values of the list.

In a further embodiment of the example method, the plurality of leaf nodes comprises a digest leaf node, the digest leaf node comprises a hash value based at least in part on hash values of the first and second leaf nodes.

Figure 11:
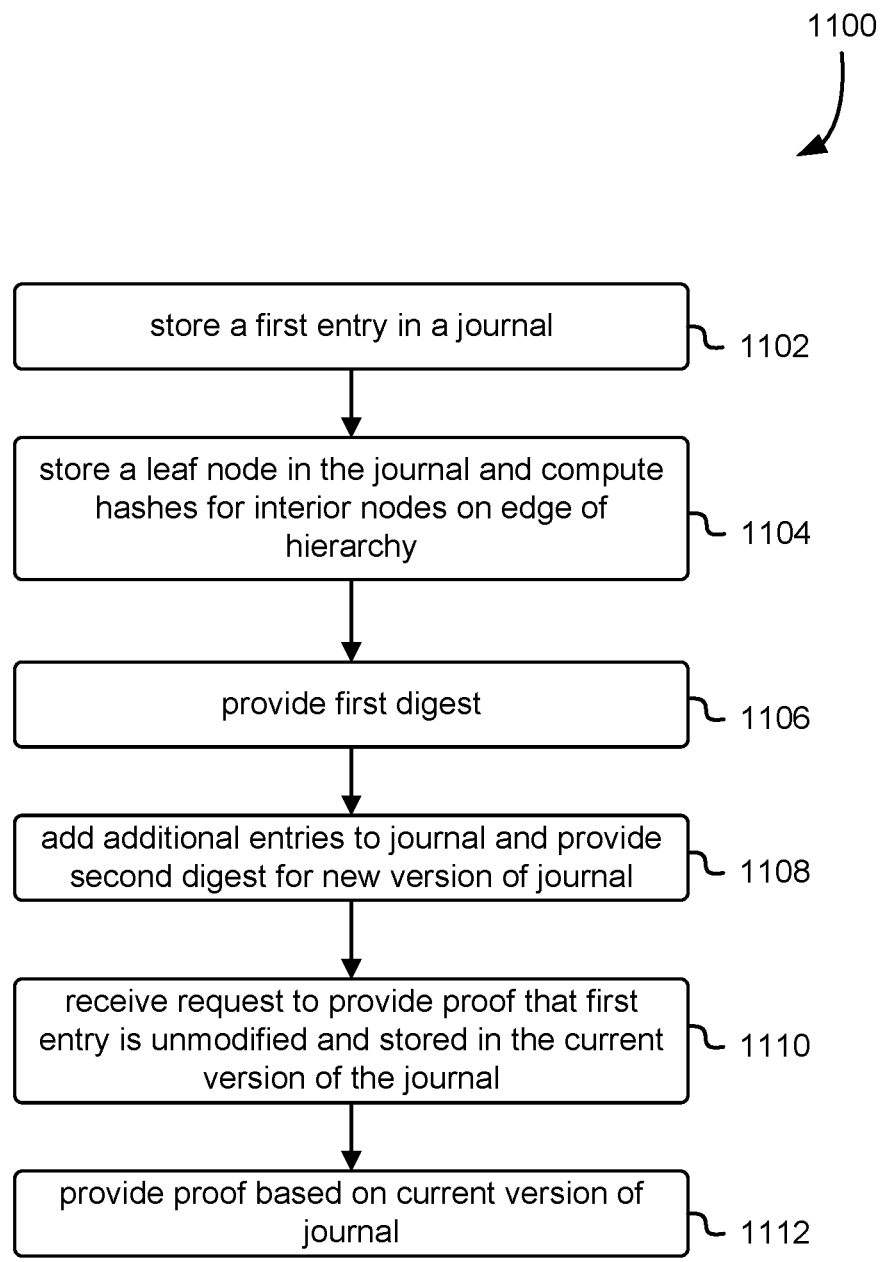
FIG. 11 illustrates an example process of performing a digest proof, in accordance with an embodiment.

FIG. 11 illustrates an example process of performing a digest proof, in accordance with an embodiment. Although the example 1100 of FIG. 11 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 1102, a journaled database management system stores a first entry in a journal. An entry, examples of which are depicted in FIG. 7, may comprise information indicative of a database transaction. For example, an entry may comprise information indicative of an insert, update, or deletion of an item of data stored in a collection of data.

At 1104, the journaled database management system stores a leaf node in the journal and computes hashes for the interior nodes on the edge of the hierarchy. For example, referring again to FIG. 7, the system may add a new leaf node at position {0, 3} and update nodes along the edge of the hierarchy of interior nodes. For example, the nodes at {0, 3}, {1, 2}, and {2,0} might be computed. Note that here, the "edge" of the hierarchy refers to nodes that represent at least one non-null value.

At 1106, the journaled database management system provides a first digest. The first digest may be retained by a client and subsequently used to confirm that a version of the journal corresponding to the first digest contains an unmodified version of the first entry.

At 1108, the journaled database management system adds additional entries to the journal. As depicted in FIG. 7, additional leaf and interior nodes are added to the hierarchy, including the digest of the journal. For example, the nodes at {0, 5}, {1, 2}, {2, 1}, and {3,0} may be updated. The system may then provide a digest covering the current version of the journal.

At 1110, the journaled database management system receives a request to provide a proof that the first entry is unmodified and stored in the current version of the journal. Note that providing the digest of the current version of the journal, by itself, may not be sufficient to prove that the entry has not been modified since it was initially added. Rather, the proof involves showing that the earlier version of the digest covers the entry in question and is subsumed in the new version.

At 1112, the journaled database management system provides the requested proof. In at least one embodiment, the proof comprises a list of hash values sufficient to show that the earlier version of the digest is subsumed by the new version. In at least one embodiment, the hash values comprise those needed to compute the digest of the new version of the journal, using one or more retained hashes in combination with the provided list.

Note that the threading of the leaf nodes contributes to the operation of the proof. The newer leaf nodes, i.e., those added after the first entry, will be based at least in part on an entry hash of the first node. Consequently, a reconstruction of the digest covering the new version can prove that the first entry is unmodified, if the reconstruction of the digest includes the use of a leaf node that was based at least in part on the first entry.

The example 1100 may be implemented by any of a variety of suitable systems, including for example the database servers 1310 depicted in FIG. 13.

In an example embodiment, a journaled database management system implements a method comprising storing an entry in a first version of a journal. The first version of the journal, upon storage of the entry, comprises a plurality of leaf nodes. The leaf nodes may individually comprise a hash value that is computed by applying a symmetric hash operator to a first operand corresponding to the hash value of a prior leaf node, and a second operand corresponding to an entry hash computed based on the entry or entries corresponding to the leaf node. The journal, upon storage of the entry, may further comprise a hierarchy of interior nodes. An interior node of the hierarchy of interior nodes may comprise a hash value that is based at least in part on the application of the symmetric hash operator to one or more children of the interior node.

The example method further comprises providing a first digest of the first version of the journal, and then, subsequent to the addition of new entries, providing a second digest of a second version of the journal.

The example method further comprises providing hash values that are sufficient to prove that the second digest is based at least in part on information included in the first digest and that the entry is unmodified and stored in the second version of the journal. Information being included in the first digest refers to the first digest being based in part on another hash. Verifying that the second digest includes information included in the first digest may therefore comprise determining that a hash used to compute the first digest was also used to compute the second digest.

In a further embodiment of the example method, the hash values are sufficient when they can be used, along with a retained hash value that was based at least in part on the entry, to compute the second digest. In this context, retained refers to a client, or other actor, keeping a copy of the value for later use.

In a further embodiment of the example method, the retained hash value corresponds to a leaf node of the journal. For example, a client device may retain an entry hash and confirm, using the provided proof, that the entry hash has been incorporated into the set of hashes that comprise the proof.

In a further embodiment of the example method, the proof that the second digest is based, at least partly, on the first digest comprises successive application of a symmetric hash operator to the list of hash values.

In a further embodiment of the example method, a proof that the one or more entries are unmodified comprises determining that a leaf-node of the journal is based at least in part on a hash value computed based at least in part on the one or more entries.

In a further embodiment of the example method, the second digest comprises one or more recomputed nodes that were frontier nodes in the first version of the journal, and wherein non-frontier nodes of the first version of the journal were not recomputed in forming the second version of the journal.

In a further embodiment of the example method, the method further comprises receiving a request to provide information for proving that the entry is unmodified and stored in the second version of the journal, wherein the request comprises at least one of information indicative of a location of the entry or information indicative of the first version of the journal.

Figure 12:
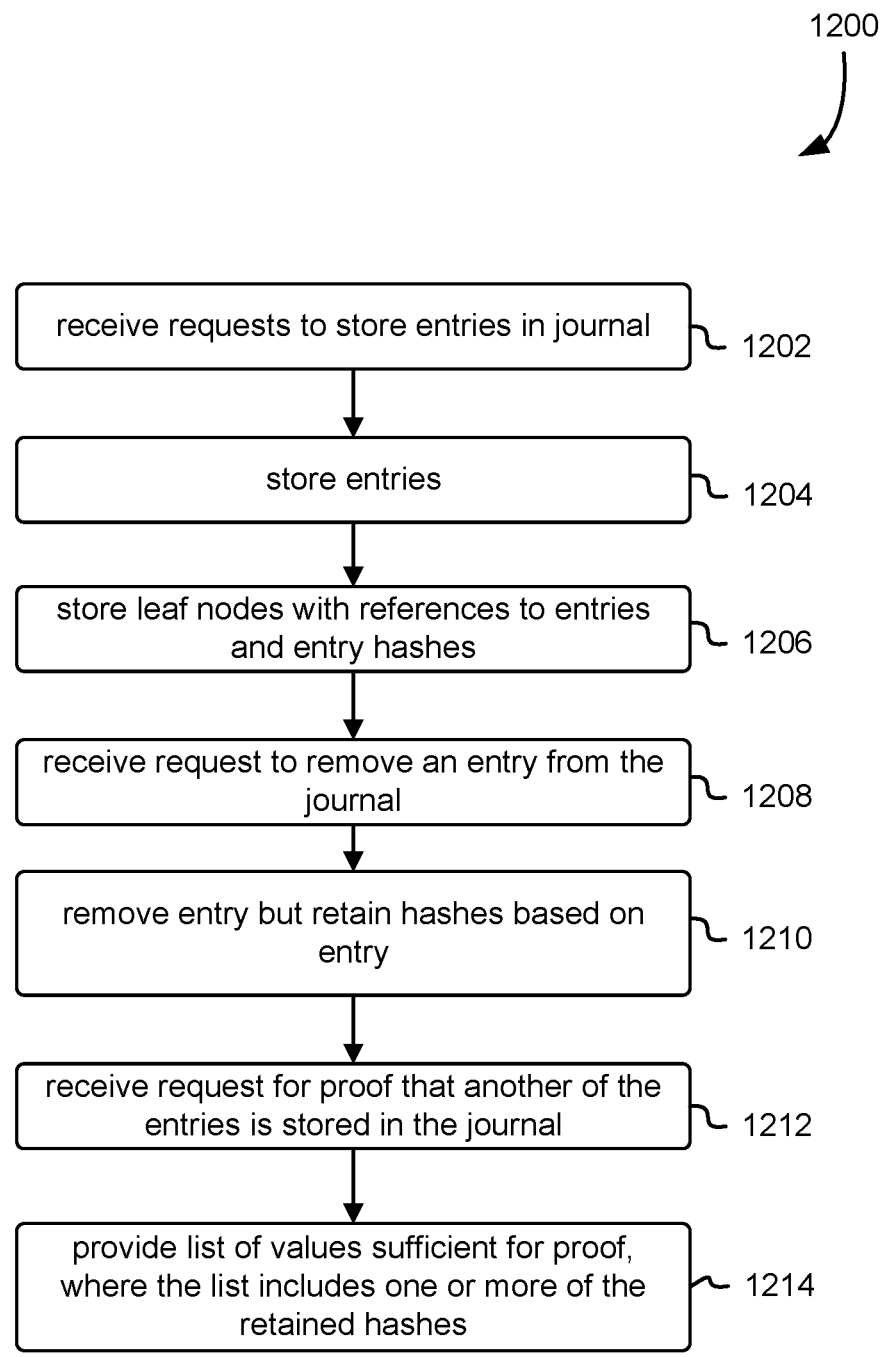
FIG. 12 illustrates an example process of journal redaction, in accordance with an embodiment.

FIG. 12 illustrates an example process of journal redaction, in accordance with an embodiment. Although the example 1200 of FIG. 12 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 1202, a journaled database management system receives requests to store entries in the journal. At 1204, the entries are stored, and at 1206 leaf nodes are added to the journal structure. The leaf nodes each include a reference to the entry and a reference to, or copy of, the entry hash.

At 1208, the journaled database management system receives a request to remove one of the entries from the journal. This may be described as redacting the entry.

At 1210, the journaled database management system deletes the entry and removes the reference to the entry from the corresponding leaf node. However, the journaled database management system maintains the reference to, or copy of, the entry hash that was computed based on the deleted entry. The system further maintains any hashes that were computed based off of this entry hash. In other words, the by retaining the entry hash for the deleted entries, the system avoids re-computation of hashes that might be dependent on the retained entry hash.

At 1212, the journaled database management system receives a request to prove that another of the added entries is stored in the journal. The system responds to the request by providing, at 1214 a list of values sufficient for the proof. In cases and embodiments, this list includes one or more of the retained hashes—either the retained entry hash or a hash value computed, directly or indirectly, from the retained entry hash.

The example 1200 may be implemented by any of a variety of suitable systems, including for example the database servers 1310 depicted in FIG. 13.

In an example embodiment, a journaled database management system implements a method comprising storing a first entry and a second entry in a journal. Upon storage of the first entry and the second entry, the journal comprises a plurality of leaf nodes. Each of the leaf nodes comprises a reference to a corresponding entry and a hash value that based at least in part on the corresponding entry. The example method further comprises receiving a request to delete the first entry from the journal, and responding to the request by removing the reference to the first entry from the leaf node. The hash value, however, is retained subsequent to the removal of the reference. The example method further comprises providing a list of hash values that is sufficient for proving that the second entry is stored in the journal. These hash values, in cases and embodiments, include hash values that were retained after the deletion.

In a further embodiment of the example method, the list of hash values is sufficient when a digest of the journal can be computed by one more applications of a symmetric hash operator to hash values of the list of hash values.

In a further embodiment of the example method, the example method further comprises providing, in response to the request, an indication that the first entry was deleted from the journal.

In a further embodiment of the example method, the hash value of the leaf node is based at least in part on a hash value of another leaf node of the plurality of leaf nodes.

In a further embodiment of the example method, the example method further comprises providing an additional list of hash values sufficient for proving that the first entry had been stored in the journal.

In a further embodiment of the example method, the list of hash values comprises one or more of the retained hash value or a hash value computed based on the retained hash value.

In a further embodiment of the example method, the journal comprises a digest hash value based at least in part on hash values of the plurality of leaf nodes. The digest hash value is not recomputed in response to deletion of the entry.

In a further embodiment of the example method, a second hash value of a second leaf node, associated with the second entry, is based at least in part on the first entry.

In a further embodiment of the example method, the redacted entry is an entry in a nested journal. As described herein, the entry hash for an entry that comprises a nested journal may correspond to the digest of the nested journal. By retaining the hash of the redacted entry, the value of this digest is permitted to remain constant.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and one or more databases 1310, and it should be understood that there can be several application servers, layers or other elements, processes or components, which may be chained or otherwise configured, which can interact to perform tasks such as obtaining data from an appropriate database. The application server(s) 1308 and database(s) may be operative on one or more servers. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database(s) 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The database(s) 1310, in an embodiment, is operable, through logic associated therewith, to receive instructions from the application server 1308 and obtain, update or otherwise process data in response thereto, and the application server 1308 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

The database(s) 1310, in an embodiment, comprise one or more journaled database management systems, such as the journaled database management system depicted in FIG. 1. A journaled database management system may, in at least some embodiments, be a distributed system operative on a plurality of servers. In other embodiments, a journaled database management system is operative on one server.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections.

However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracl®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   a memory comprising instructions that, in response to execution by the at least one processor, cause the system to at least:
      store one or more entries in a first version of a journal, wherein the one or more entries are based at least in part on transactions performed on a collection of data, wherein the first version of the journal, upon storage of the one or more entries, comprises:
         an ordered plurality of leaf nodes, wherein a leaf node of the ordered plurality of leaf nodes comprises a hash value based at least in part on a hash value of a prior node in the ordered plurality of leaf nodes;
         a hierarchy of interior nodes, wherein an interior node comprises a hash value based at least in part on hash values of one or more children of the interior node; and
      provide a first digest of the first version of the journal, wherein the first digest is usable in a proof that the one or more entries are unmodified and stored in the first version of the journal;
      provide, subsequent to one or more additional entries being added to the journal, a second digest of a second version of the journal; and
      provide hash values sufficient to prove that the second digest is based at least in part on information included in the first digest and that the one or more entries are unmodified and stored in the second version of the journal.

2. The system of claim 1, wherein the provided hash values are sufficient when the hash values can be used, with a retained hash value based at least in part on the one or more entries, to compute the second digest.

3. The system of claim 2, wherein the retained hash value corresponds to a leaf node of the journal.

4. The system of claim 1, wherein the proof that the second digest is based at least in part on the first digest comprises successive application of a symmetric hash operator to the provided hash values.

5. The system of claim 1, wherein a proof that the one or more entries are unmodified comprises determining that a leaf-node of the journal is based at least in part on a hash value computed based at least in part on the one or more entries.

6. The system of claim 1, the memory comprising further instructions that, in response to execution by the at least one processor, cause the system to at least receive a request to verify that the one or more entries are unmodified and stored in the second version of the journal, wherein the request comprises at least one of information indicative of a location of the one or more entries or information indicative of the first version of the journal.

7. A computer-implemented method, comprising:
   storing an entry in a first version of a journal, wherein the first version of the journal, upon storage of the entry, comprises:
      a plurality of leaf nodes, wherein a leaf node of the plurality of leaf nodes comprises a hash value based at least in part on a hash value of a prior node in the plurality of leaf nodes; and
      a hierarchy of interior nodes, wherein an interior node of the hierarchy of interior nodes comprises a hash value based at least in part on hash values of one or more children of the interior node;
   providing a first digest of the first version of the journal, wherein the first digest is usable for proving that the entry is unmodified and stored in the first version of the journal;
   providing a second digest of a second version of the journal; and
   providing hash values sufficient to prove that the second digest is based at least in part on information included in the first digest and that the entry is unmodified and stored in the second version of the journal.

8. The computer-implemented method of claim 7, wherein the list of hash values is sufficient when the provided hash values can be used, with an additional hash value based at least in part on the entry, to compute the second digest.

9. The computer-implemented method of claim 7, wherein the additional hash value corresponds to a leaf-node of the journal.

10. The computer-implemented method of claim 7, wherein proving that the second digest is based at least in part on the first digest comprises successive application of a hash operator to the provided hash values.

11. The computer-implemented method of claim 9, wherein the hash operator is a symmetric hash operator.

12. The computer-implemented method of claim 7, wherein the second digest comprises one or more recomputed nodes that were frontier nodes in the first version of the journal, and wherein non-frontier nodes of the first version of the journal were not recomputed in forming the second version of the journal.

13. The computer-implemented method of claim 7, further comprising:
   receiving a request to provide information for proving that the entry is unmodified and stored in the second version of the journal, wherein the request comprises at least one of information indicative of a location of the entry or information indicative of the first version of the journal.

14. A non-transitory computer-readable storage medium storing thereon executable instructions that, as a result of being executed by one or more processors of a computer system, cause the computer system to at least:
   store an entry in a first version of a journal, wherein the first version of the journal, upon storage of the entry, comprises:
      a plurality of leaf nodes, wherein a leaf node of the plurality of leaf nodes comprises a hash value based at least in part on a hash value of a prior node in the plurality of leaf nodes; and
      a hierarchy of interior nodes, wherein an interior node of the hierarchy of interior nodes comprises a hash value based at least in part hash values of one or more children of the interior node;
   provide a first digest of the first version of the journal, wherein the first digest is usable for proving that the entry is unmodified and stored in the first version of the journal;
   provide a second digest of a second version of the journal; and
   provide hash values sufficient to prove that the second digest is based at least in part on information included in the first digest and that the entry is unmodified and stored in the second version of the journal.

15. The non-transitory computer-readable storage medium of claim 14, wherein the provided hash values are sufficient when the provided hash values can be used, with an additional hash value, to compute the second digest.

16. The non-transitory computer-readable storage medium of claim 15, wherein the additional hash value is from a leaf node of the journal.

17. The non-transitory computer-readable storage medium of claim 14, wherein proving that the one or more entries are unmodified comprises determining that a leaf-node of the journal is based at least in part on a hash value computed based at least in part on the entry.

18. The non-transitory computer-readable storage medium of claim 14, wherein proving that the second digest is based at least in part on the first digest comprises successive application of a symmetric hash operator to the provided hash values.

19. The non-transitory computer-readable storage medium of claim 14, wherein the second digest comprises one or more nodes that were frontier nodes in the first version of the journal, and wherein non-frontier nodes of the first version of the journal are not recomputed.

20. The non-transitory computer-readable storage medium of claim 14, the non-transitory computer-readable storage medium storing thereon further executable instructions that, as a result of being executed by one or more processors of the computer system, cause the computer system to at least:
   receive a request to provide information for proving that the entry is unmodified and stored in the second version of the journal, wherein the request comprises at least one of information indicative of a location of the entry or information indicative of the first version of the journal.

* * * * *